US010236743B2

(12) United States Patent
Chen et al.

(10) Patent No.: US 10,236,743 B2
(45) Date of Patent: Mar. 19, 2019

(54) MOTOR HAVING STRUCTURES FOR IMPROVING DYNAMIC BALANCE AND IMPROVING INSTALLATION OF A RESET PROTECTOR

(71) Applicant: Zhongshan Broad-Ocean Motor Co., Ltd., Zhongshan (CN)

(72) Inventors: Jinqiang Chen, Zhongshan (CN); Huayun Xiong, Zhongshan (CN); Haiqi Lin, Zhongshan (CN); Ping Lu, Zhongshan (CN); Shuangxi Song, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 229 days.

(21) Appl. No.: 15/358,068

(22) Filed: Nov. 21, 2016

(65) Prior Publication Data
US 2017/0257003 A1 Sep. 7, 2017

(30) Foreign Application Priority Data

Mar. 4, 2016 (CN) .............. 2016 2 0169831 U
Mar. 4, 2016 (CN) .............. 2016 2 0172903 U
Mar. 14, 2016 (CN) .............. 2016 2 0195191 U
Mar. 24, 2016 (CN) .............. 2016 2 0240103 U
Apr. 25, 2016 (CN) .............. 2016 2 0354619 U

(51) Int. Cl.
*H02K 5/15* (2006.01)
*H02K 5/16* (2006.01)
*H02K 1/22* (2006.01)
*H02K 1/12* (2006.01)

(52) U.S. Cl.
CPC ............. *H02K 5/15* (2013.01); *H02K 1/12* (2013.01); *H02K 1/22* (2013.01); *H02K 5/16* (2013.01)

(58) Field of Classification Search
None
See application file for complete search history.

(56) References Cited

U.S. PATENT DOCUMENTS

| 2015/0222152 A1* | 8/2015 | Yamada | ............... H02K 5/02 310/68 B |
| 2017/0222503 A1* | 8/2017 | Wang | ............... F24F 1/22 |

* cited by examiner

*Primary Examiner* — Henry E Lee, III
(74) *Attorney, Agent, or Firm* — Matthias Scholl, PC; Matthias Scholl

(57) ABSTRACT

A motor, including: a rotational shaft, a rotor, a stator, a housing, a first end cover, and a second end cover. The first end cover includes: a cover body including a bottom surface and a top surface, a bearing cavity, and a plurality of first bosses. The rotor is mounted on the rotational shaft; the stator is nested and installed inside the housing. The rotor is nested inside the stator; the first end cover and the second end cover are disposed on a rear end and a front end of the housing, respectively. The bearing cavity is disposed in the middle of the bottom surface of the cover body. The first bosses are circumferentially disposed at intervals on the top surface of the cover body. Outer side surfaces of the first bosses are located on a circle having a circle center coincident with the center of the cover body.

20 Claims, 21 Drawing Sheets

MOTOR HAVING STRUCTURES FOR IMPROVING DYNAMIC BALANCE AND IMPROVING INSTALLATION OF A RESET PROTECTOR

CROSS-REFERENCE TO RELATED APPLICATIONS

Pursuant to 35 U.S.C. § 119 and the Paris Convention Treaty, this application claims the benefit of Chinese Patent Application No. 201620240103.X filed Mar. 24, 2016, Chinese Patent Application No. 201620195191.6 filed Mar. 14, 2016, Chinese Patent Application No. 201620169831.6 filed Mar. 4, 2016, Chinese Patent Application No. 201620172903.2 filed Mar. 4, 2016, and Chinese Patent Application No. 201620354619.7 filed Apr. 25, 2016, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a motor.

Description of the Related Art

Conventional motors have the following disadvantages.

1. The end covers of motors have inclined outer edge surface. This increases the difficulty to clamp and position the end covers.

2. The rotation of the cast-aluminum rotor of a motor is unbalanced. Thus, in operation, the motor produces serious vibration and large noise.

3. The end cover of conventional motors have a plurality of hole plugs to seal the outlet holes on the end cover. However, the hole plugs have complex structure and tend to be dislodged resulting in a loss of seal.

SUMMARY OF THE INVENTION

In view of the above-described problems, it is one objective of the invention to provide a motor that has stable operation and low noise, and the end cover of the motor has good sealing property.

To achieve the above objective, in accordance with one embodiment of the invention, there is provided a motor comprising: a rotational shaft, a rotor, a stator, a housing, a first end cover, and a second end cover. The first end cover comprises: a cover body comprising a bottom surface and a top surface, a bearing cavity, and a plurality of first bosses. The rotor is mounted on the rotational shaft. The stator is nested and installed inside the housing. The rotor is nested inside the stator. The first end cover and the second end cover are disposed on a rear end and a front end of the housing, respectively. The bearing cavity is disposed in a middle of the bottom surface of the cover body. The first bosses are circumferentially disposed at intervals on the top surface of the cover body. Outer side surfaces of the first bosses are located on a circle having a circle center coincident with a center of the cover body.

In a class of this embodiment, first recesses are disposed on the top surface of the cover body between the outer side surfaces of the first bosses and an outer edge of the cover body. An opening is disposed on the top surface of the cover body.

In a class of this embodiment, at least one wire slot is disposed on the outer edge of the cover body outside the opening. The wire slot communicates with the opening.

In a class of this embodiment, counterbores are disposed on the top surface of the cover body at an inner wall of the opening. A circular hole is disposed at the top surface of the cover body.

In a class of this embodiment, a plurality of mounting bosses is disposed on the bottom surface of the cover body. A mounting seat is disposed in a middle of the top surface of the cover body. A plurality of convex parts is extended in an axial direction and circumferentially distributed at intervals on an outer wall of the mounting seat.

In a class of this embodiment, the rotor is a cast-aluminum rotor and comprises: a rotor core, end rings, and a conductive strip. A shaft hole is disposed in a middle of the rotor core. The end rings are mounted on end parts of the rotor core. The conductive strip passes through the rotor core and is electrically connected to the end rings on the end parts of the rotor cores. An annular groove is disposed on an end face of a first end ring. A balance weight is mounted inside the annular groove.

In a class of this embodiment, the annular groove of the first end ring has a U-shaped cross section. A plurality of fan blades is disposed on an end face of a second end ring. And balance columns are disposed on the end face of the second end ring between every two adjacent fan blades.

In a class of this embodiment, a hole plug is mounted on the wire slots. The port lug comprises: an inner baffle, an outer baffle, and a plurality of plug bodies disposed at intervals between the inner baffle and the outer baffle; cavities are formed between every two adjacent plug bodies. An outer wall of the inner baffle is attached to an inner wall of the edge of the cover body, and an inner wall of the outer baffle is attached to an outer wall of the edge of the cover body. Each of the plug bodies is embedded in corresponding wire slot.

In a class of this embodiment, tops of the inner baffle, the outer baffle, and the plug bodies are arranged in a same plane; heights and widths of the inner baffle and the outer baffle are larger than heights and widths of the plug bodies to form first necks between the inner baffle and the outer baffle at two sides and bottom parts of each of the plug bodies. The cover body is embedded in the first necks.

In a class of this embodiment, a mounting structure for a reset protector is disposed on the housing. The mounting structure comprises: a fixing clamp and a buckle clamp. A mounting trough is disposed on a middle of the fixing clamp, and a first through hole is also disposed on the fixing clamp. The first through hole communicates with the mounting trough. The reset protector is installed in the mounting trough, and a button of the reset protector is protruded from the first through hole. The buckle clamp is installed on the fixing clamp for fixing the reset protector inside the mounting trough.

In a class of this embodiment, second necks are disposed on an outer wall of the fixing clamp at two sides of the first through hole; second recesses are disposed on two side walls of the reset protector; second bosses are disposed on an inner wall of the mounting trough. The second bosses are embedded in the second recesses. The buckle clamp comprises: an annular press plate disposed in a middle of the buckle clamp and mounting earrings disposed at two sides of the annular press plate; mounting feet are disposed at two side walls of the fixing clamp. The annular press plate presses on a bottom of the reset protector. The mounting earrings and the mounting feet are installed together via screws or rivets.

In a class of this embodiment, a capacitance assembly is optionally installed on an outer side of the housing. The capacitance assembly comprises: a casing, a cover, and a capacitance. A cavity is disposed in a middle of the casing. The capacitance is installed in the cavity. The cover is disposed on a top of the casing and covers an opening at a top of the cavity. A voltage converting switch is installed in the cavity. A second through hole is disposed on the cover above the voltage converting switch. A lid is installed on a top of the cover for covering the second through hole.

In a class of this embodiment, a temperature controller is installed in the cavity. An annular convex part is convex from the top of the cover at an inner wall of the second through hole. An annular groove is disposed at an edge of a bottom part of the lid. The annular convex part is embedded in the annular groove. A plurality of first mounting earrings is extended out of the annular convex part. A plurality of second mounting earrings is extended out of the lid. And each of the first mounting earrings and corresponding second mounting earrings are locked together via screws. A sealing ring is embedded in the annular groove.

Advantages of the motor of the invention according to embodiments of the invention are summarized as follows:

1. The first bosses are circumferentially disposed at intervals on the top surface of the cover body. The outer side surfaces of the first bosses are disposed on the circle having the circle center coincident with the center of the cover body. When clamping and positioning the cover body, the outer side surfaces of the first bosses are clamped by machines to fix the cover body. This operation is not restricted by the outer edge surface of the edge of the end cover. Therefore, it is much convenient to clamp and position the end cover and to process the spigot and is beneficial to improve the production efficiency.
2. The first recesses are disposed on the top surface of the cover body between the outer side surfaces of the first bosses and the outer edge of the cover body, which is convenient for the claw of the machine to clamp the outer side surfaces of the first bosses by the first recesses so as to make the clamping and positioning more easily and improve the production efficiency. The opening is disposed on the top surface of the cover body, so that the arrangement of terminals on the wiring board inside the end cover is directly observed. At least one wire slot is disposed on the edge of the cover body outside the opening. The wire slot communicates with the opening for leading out different wires.
3. The counterbores are disposed on the top surface of the cover body at the inner wall of the opening to install screws connected to the ground wire. When the screws connected to the ground wire are installed, a baffle is installed on the opening for covering the screws connected to the ground wire.
4. The circular hole is disposed at the top surface of the cover body. When the protector is installed on the bottom surface of the end cover, the reset switch of the protector is protruded out of the circular hole, which is convenient for the user to operate.
5. The mounting bosses are disposed on the bottom surface of the cover body, and the screw hole is disposed on each of the mounting bosses for installing devices such as the wiring board assembly and the protector. The mounting seat is disposed at the middle of the top surface of the cover body. The convex parts are extended in the axial direction and circumferentially distributed at intervals on the outer wall of the mounting seat. The mounting seat and the convex parts are designed to install a shock pad and make the clamping of the motor convenient.
6. The annular groove is disposed on the end face of the first end ring of the cast-aluminum rotor, and the balance weight is mounted inside the annular groove to correct dynamic unbalance. The correction of the dynamic unbalance is not affected by the distance between the cast-aluminum rotor and the bearing of the motor or the distance between the cast-aluminum rotor and the end cover.
7. The port lug comprises: the inner baffle, the outer baffle, and the plug bodies disposed at intervals between the inner baffle and the outer baffle. Each of the plug bodies is embedded in corresponding wire slot, so that each hole plug is able to seal several wire slots, which is convenient for installation and greatly improves the production efficiency. In addition, the plug bodies embedded in the wire slots are not easily pressed in or out under the obstruction of the inner baffle and the outer baffle, thus ensuring the sealing property of the wire slot.
8. The voltage converting switch is installed inside the cavity of the casing of the capacitance assembly to solve the problem that the voltage converting switch is unable to install on the rear end cover of the motor because the space is occupied by the fan blades. As the voltage converting switch is installed in the cavity of the casing, no other space of the motor is occupied, and the installation is convenient and is not easily affected by the ambient environment. In addition, when converting the low voltage or the high voltage, it only requires to open the lid to rotate a plug of the voltage converting switch, the operation of which is very convenient. The capacitance, the voltage converting switch, and the temperature controller are all installed in the cavity of the casing, so that the integral structure of the motor is much compact and the installation efficiency is improved.

BRIEF DESCRIPTION OF THE DRAWINGS

The invention is described hereinbelow with reference to the accompanying drawings, in which.

DETAILED DESCRIPTION OF THE EMBODIMENTS

Figure 1:
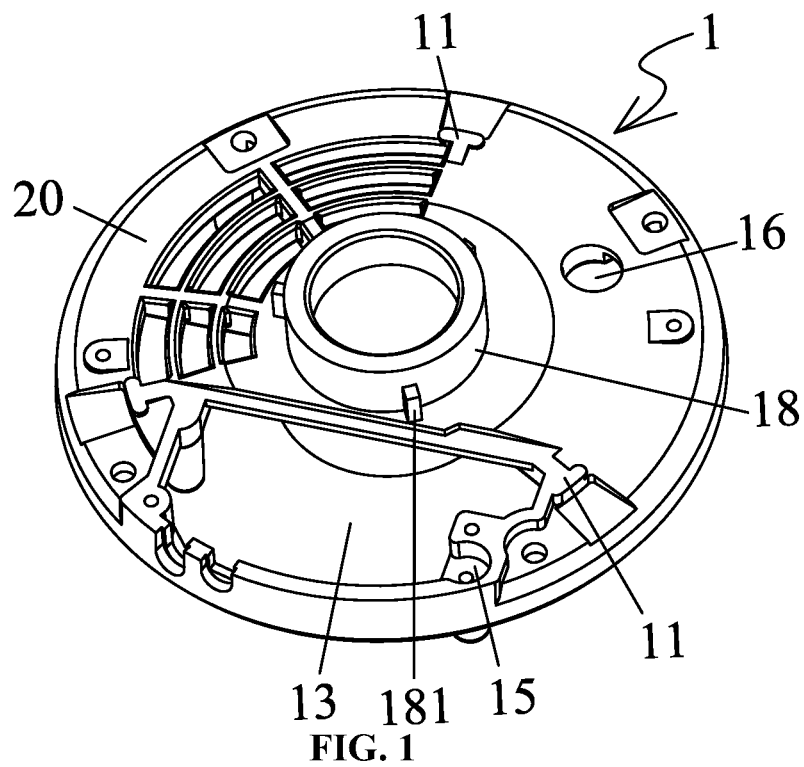
FIG. 1 is a first stereogram of an end cover of a motor in accordance with Example 1.
Figure 2:
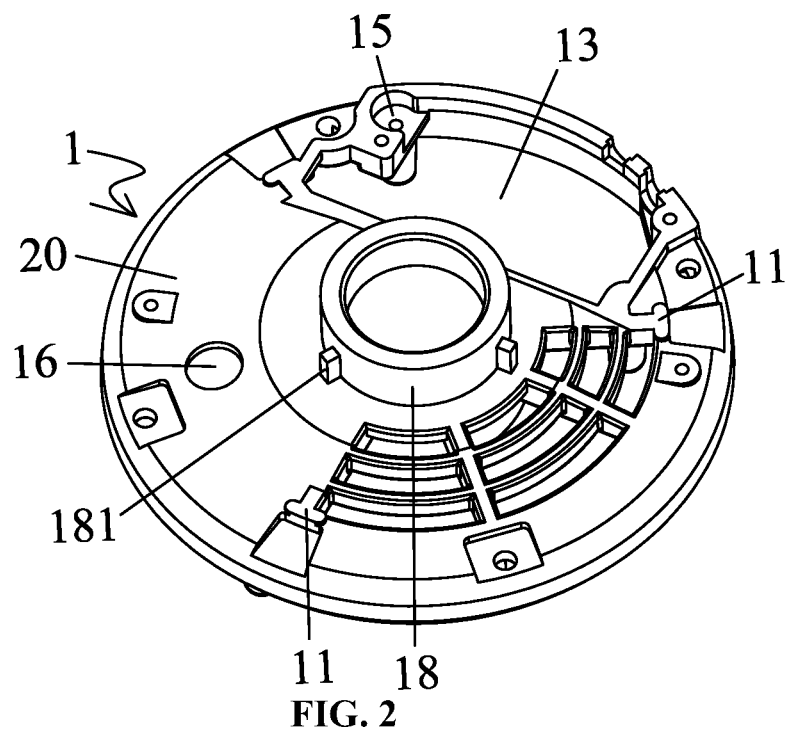
FIG. 2 is a second stereogram of an end cover of a motor in accordance with Example 1.
Figure 3:
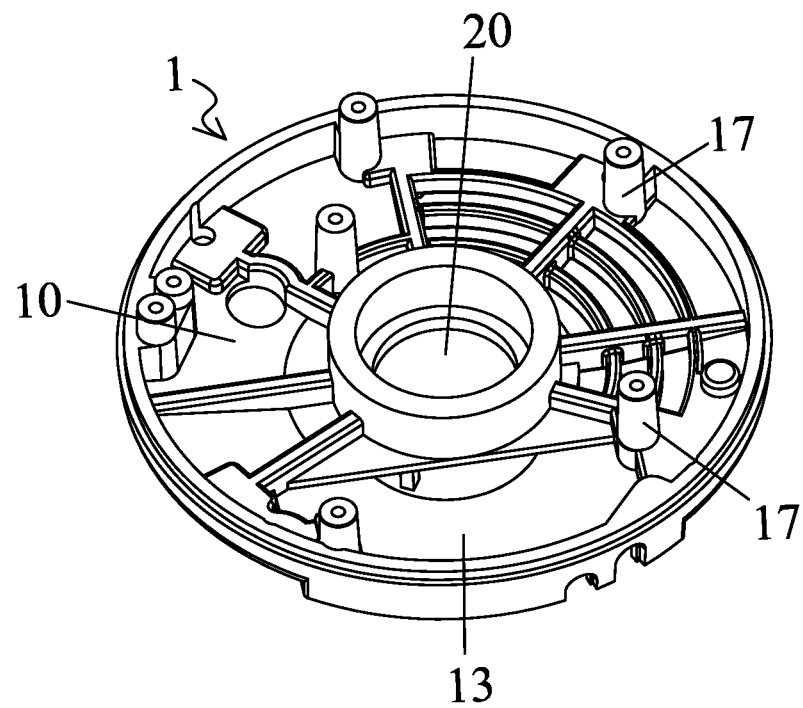
FIG. 3 is a third stereogram of an end cover of a motor in accordance with Example 1.
Figure 4:
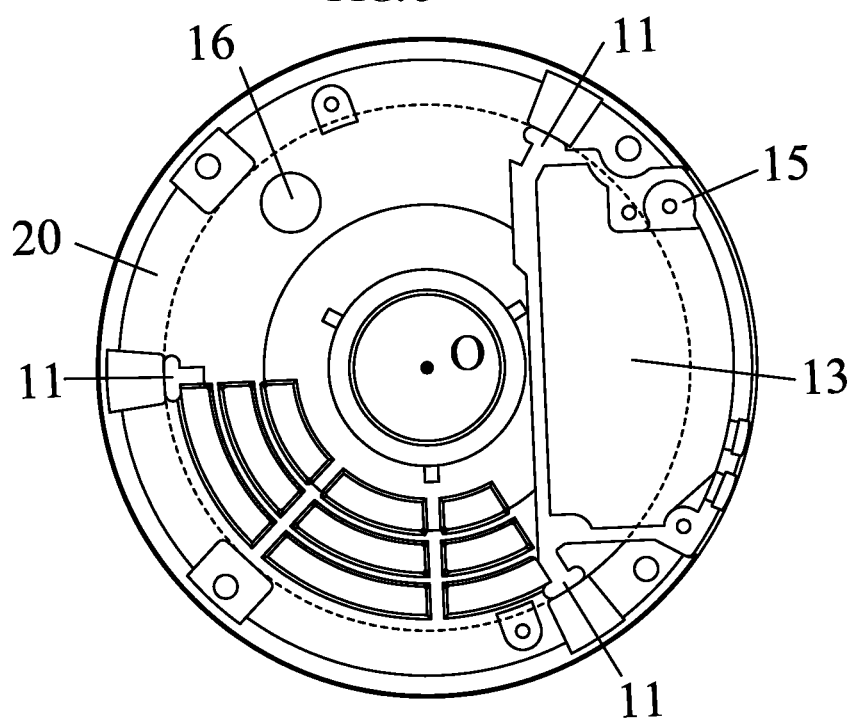
FIG. 4 is a top view of an end cover of a motor in accordance with Example 1.
Figure 5:
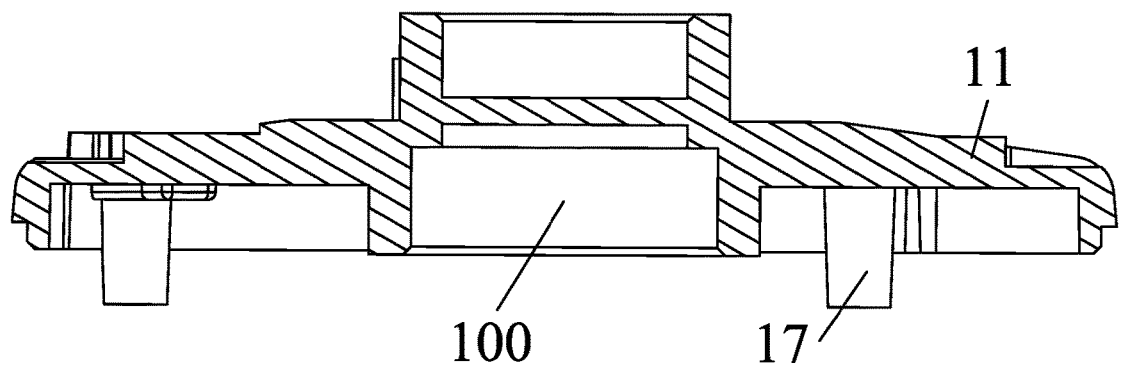
FIG. 5 is a cross sectional view of an end cover of a motor in accordance with Example 1.

For further illustrating the invention, experiments detailing a motor are described below. It should be noted that the following examples are intended to describe and not to limit the invention.

EXAMPLE 1

As shown in FIGS. 1-5, an end cover of a motor comprises a cover body 1. A bearing cavity 100 is disposed in a middle of a bottom surface 10 of the cover body 1. A plurality of first bosses 11 is circumferentially disposed at intervals on a top surface 20 of the cover body 1. Outer side surfaces of the bosses are disposed at a circle having a circle center O coincide with a center of the cover body 1. A number of the first bosses 11 is three, and the three first bosses 11 are uniformly distributed at a circumference of the cover body. First recesses are disposed on the top surface 20 of the cover body 1 between outer side surfaces of the first bosses 11 and an outer edge of the cover body 1. An opening 13 is disposed on the top surface 20 of the cover body 1. At least one wire slot is disposed outside the opening 13 on the edge of the cover body 1 for communicating with the opening 13. Counterbores 15 are disposed on an inner wall of the opening 13 on the top surface of the cover body 1. A circular hole 16 is disposed on the top surface 20 of the cover body 1. A plurality of mounting bosses 17 is disposed on the bottom surface 10 of the cover body 1. A mounting seat 18 is disposed in a middle of the top surface 20 of the cover body 1, and a plurality of convex parts 181 is circumferentially arranged on an outer wall of the mounting seat 18 and each convex part is extended in an axial direction.

Figure 6:
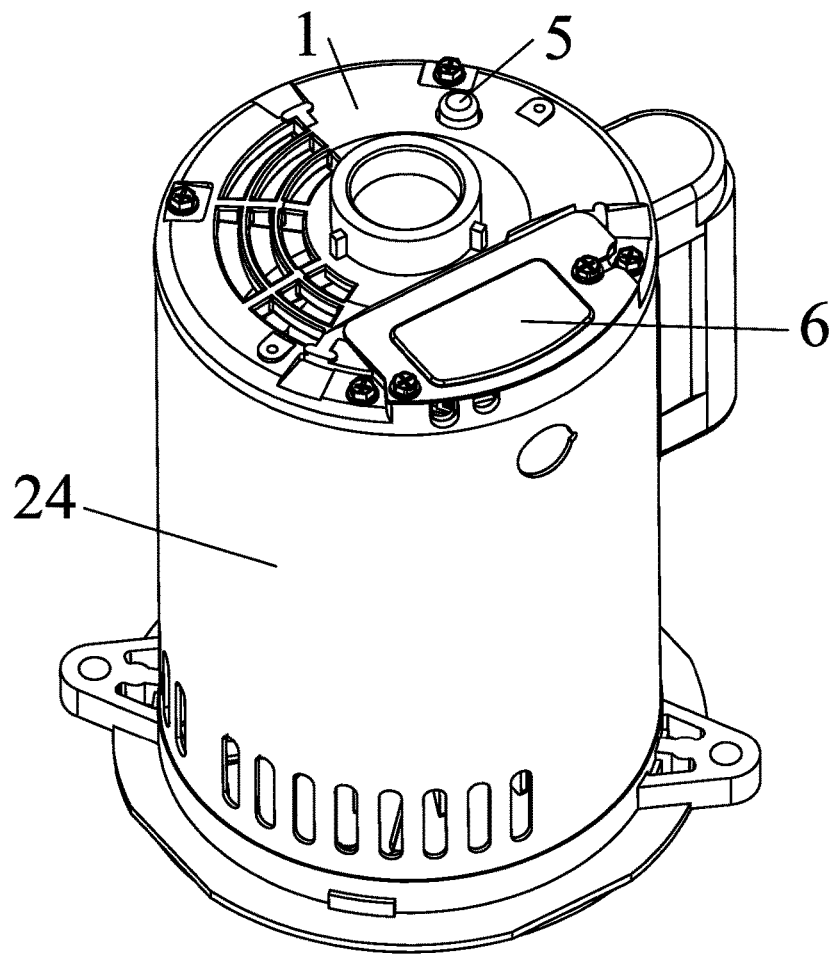
FIG. 6 is a stereogram of a motor in accordance with Example 1.
Figure 7:
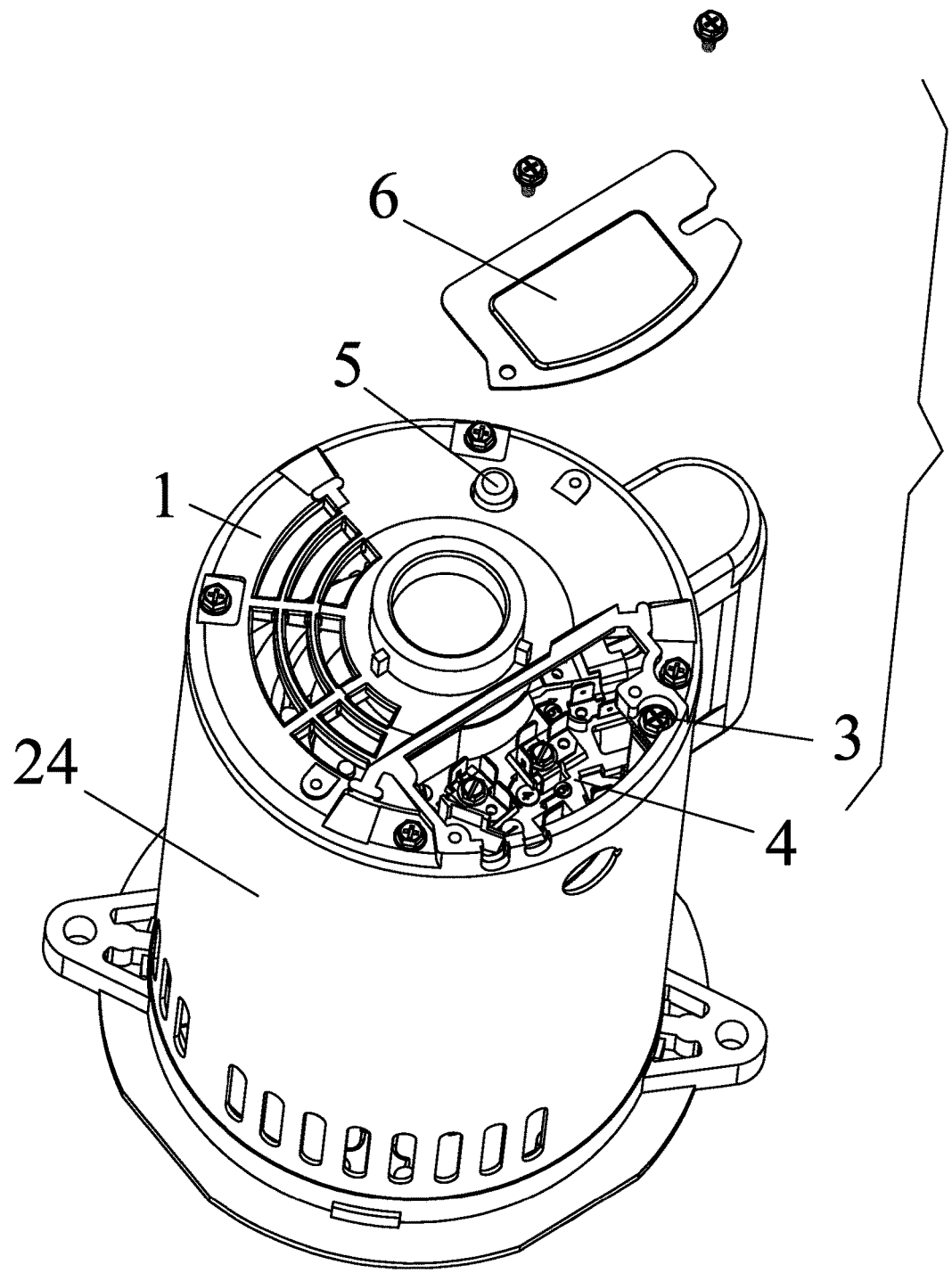
FIG. 7 is an exploded view of a motor in accordance with Example 1.
Figure 8:
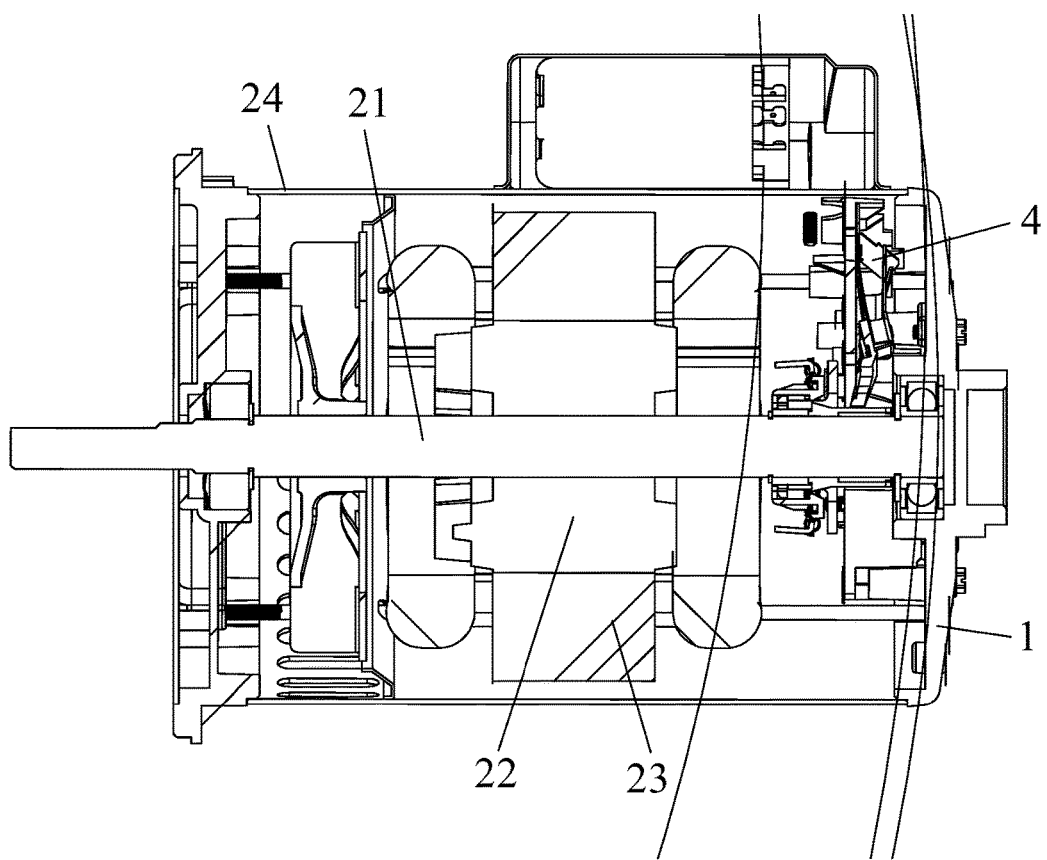
FIG. 8 is a cross sectional view of a motor in accordance with Example 1.
Figure 9:
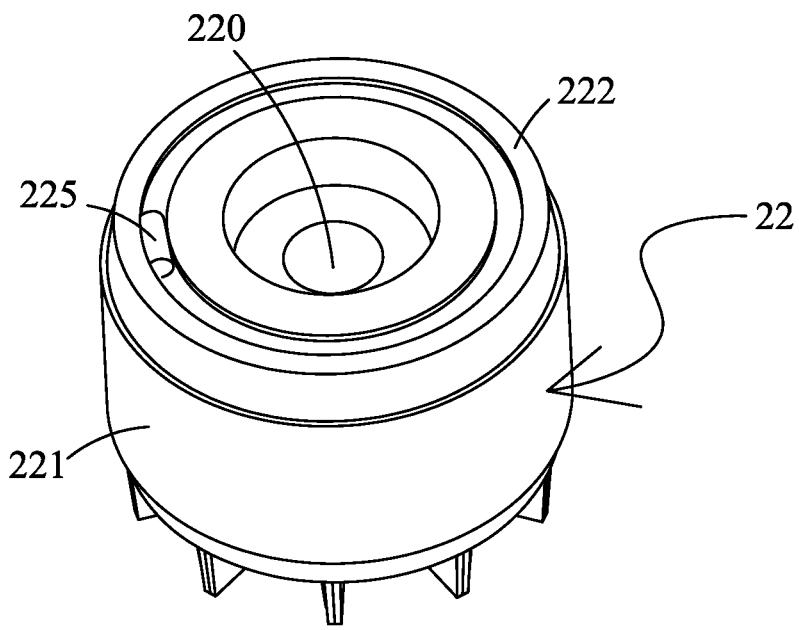
FIG. 9 is a stereogram of a cast-aluminum rotor from one angle in accordance with Example 2.
Figure 10:
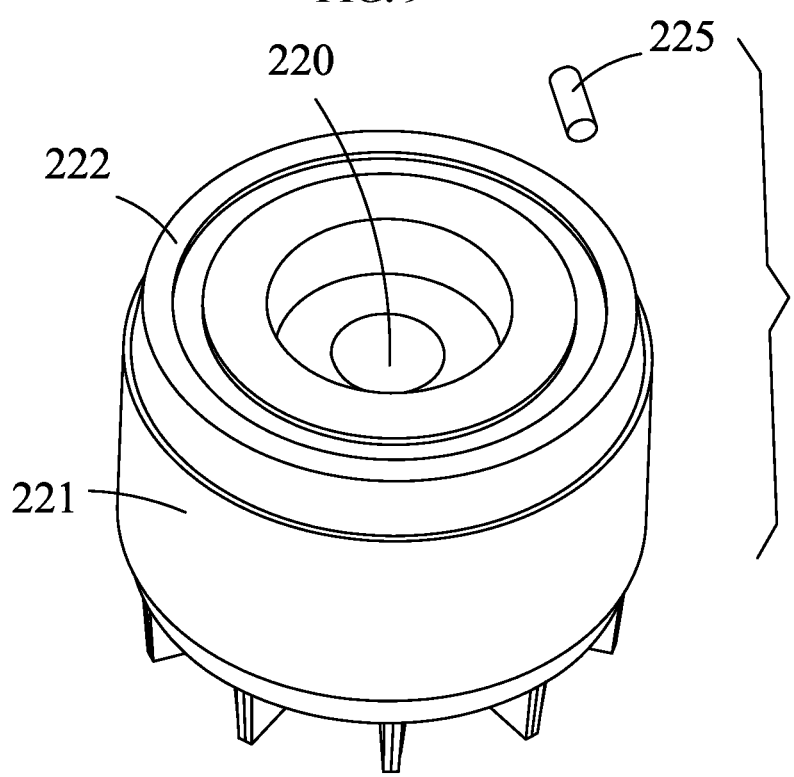
FIG. 10 is an exploded view of a cast-aluminum rotor in accordance with Example 2.
Figure 11:
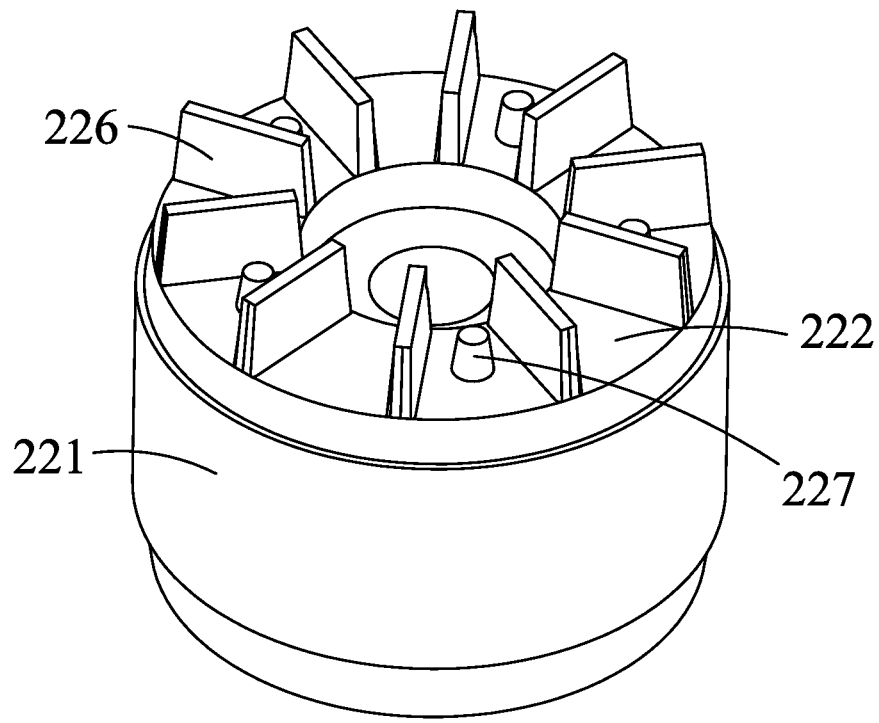
FIG. 11 is a stereogram of a cast-aluminum rotor from another angle in accordance with Example 2.
Figure 12:
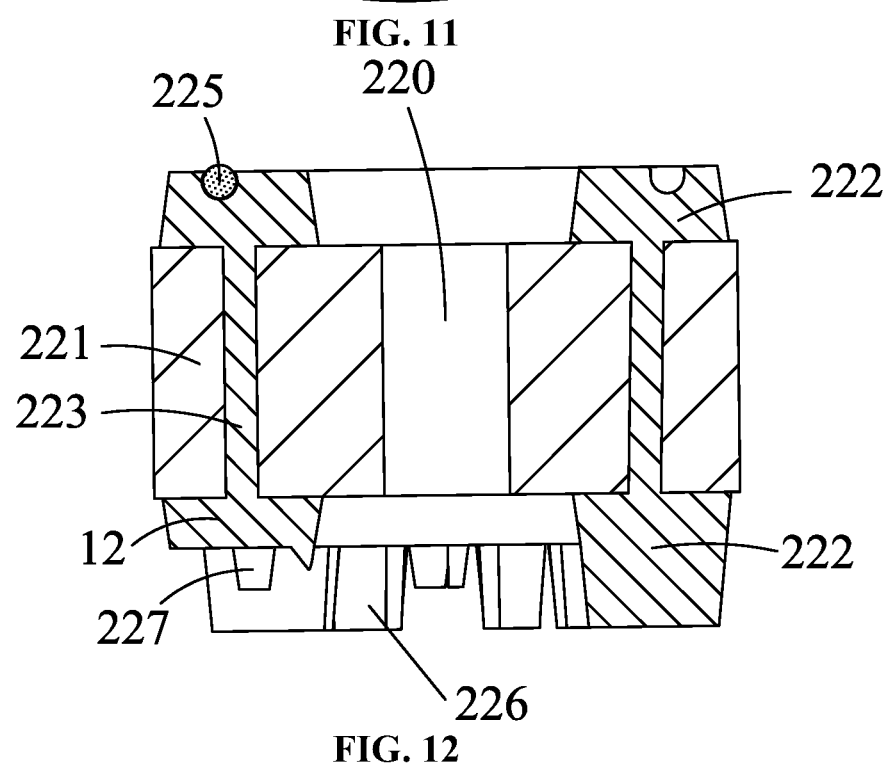
FIG. 12 is a structure diagram of a cast-aluminum rotor in accordance with Example 2.
Figure 13:
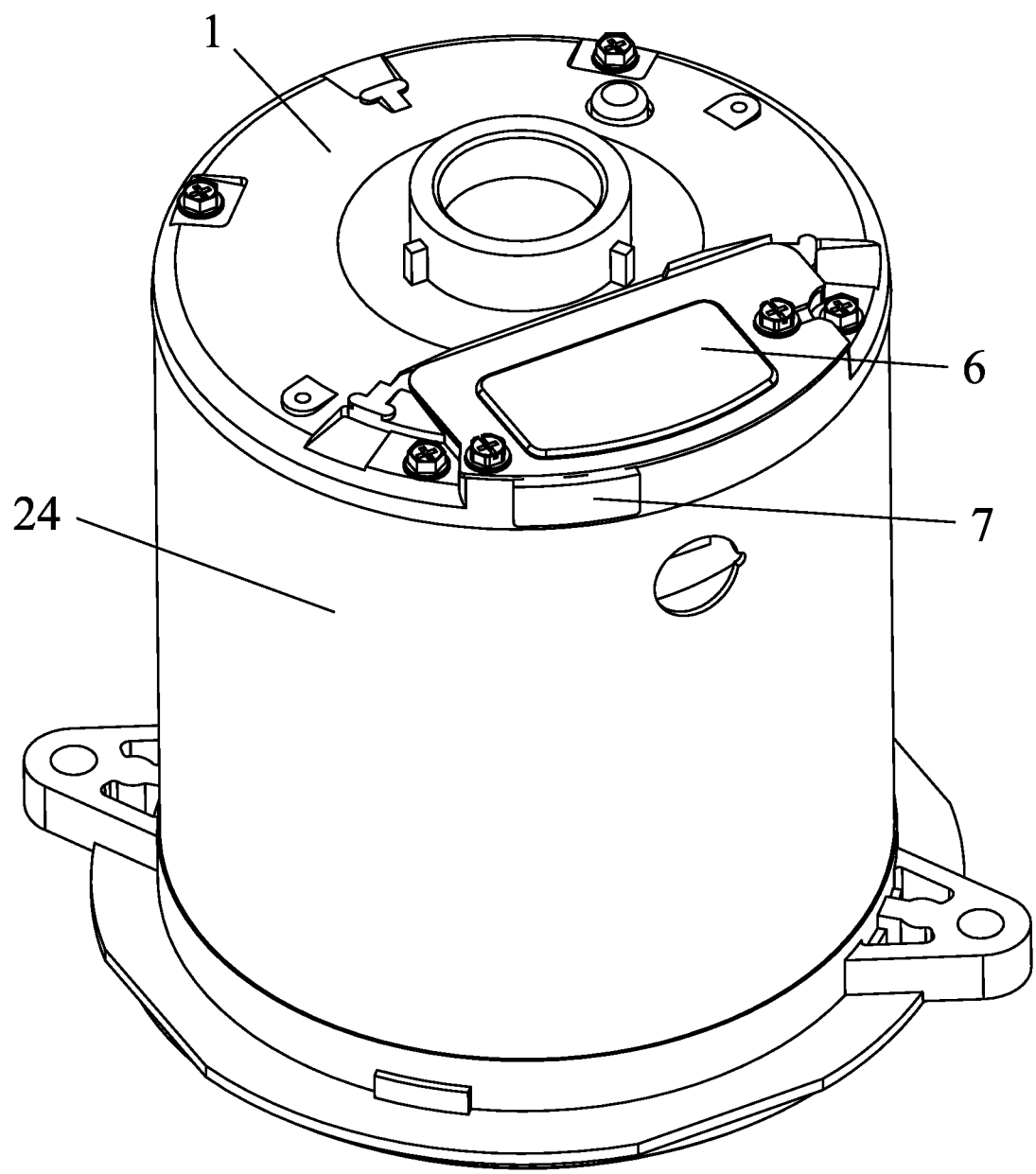
FIG. 13 is a stereogram of a motor in accordance with Example 3.
Figure 14:
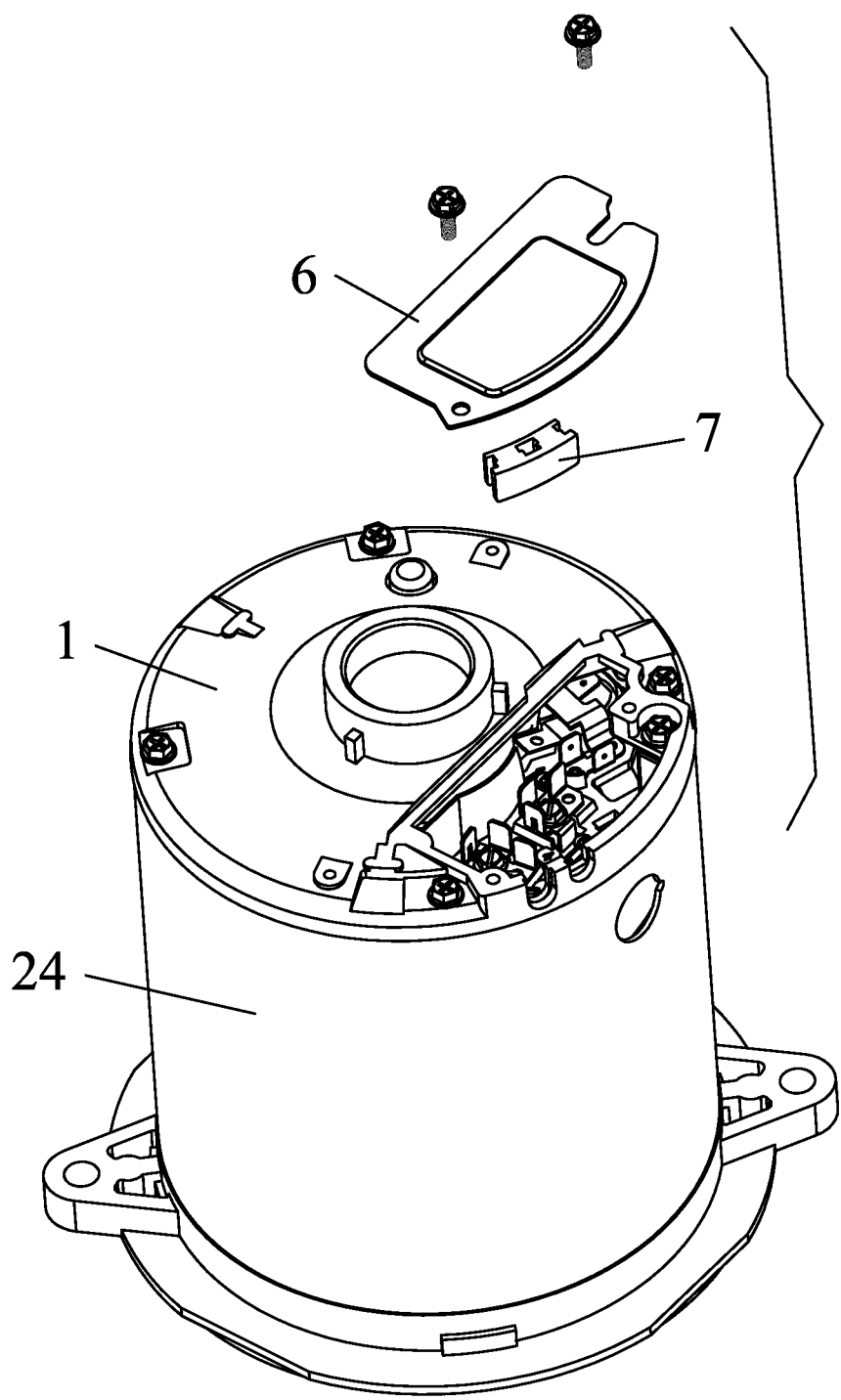
FIG. 14 is an exploded view of a motor in accordance with Example 3.
Figure 15:
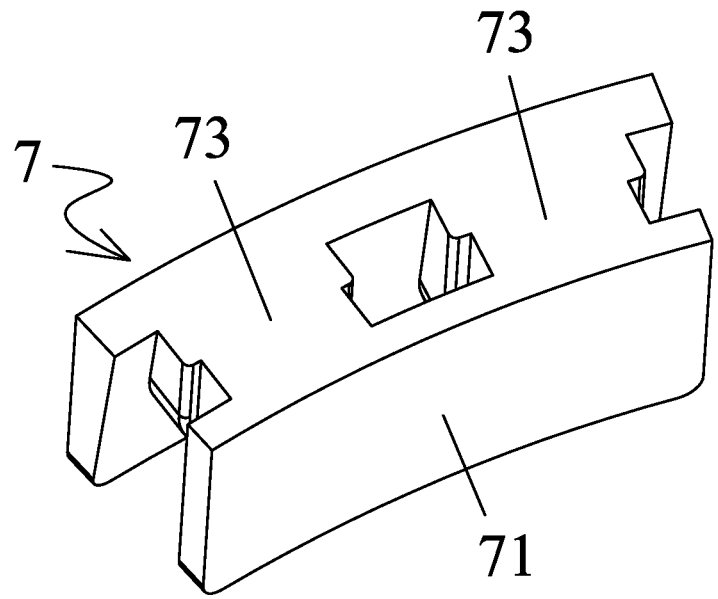
FIG. 15 is a stereogram of a hole plug from one angle in accordance with Example 3.
Figure 16:
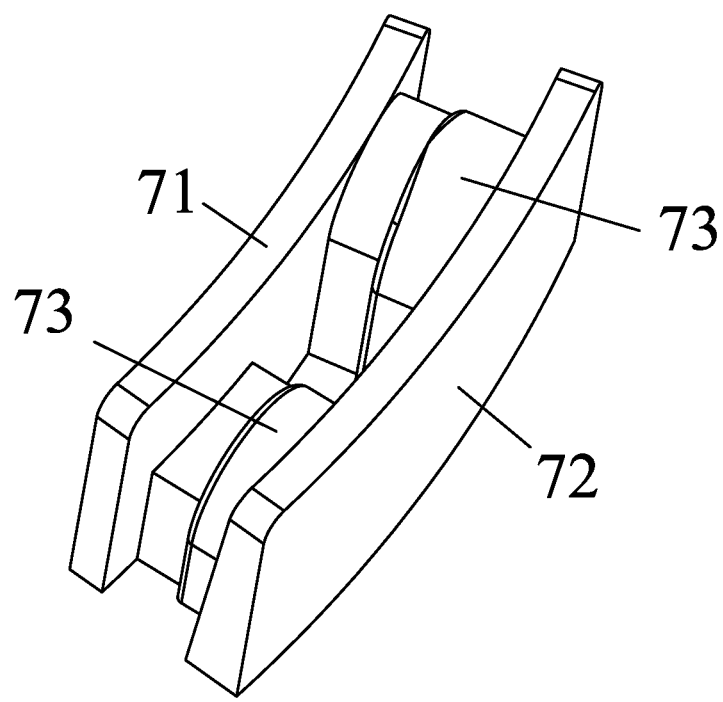
FIG. 16 is a stereogram of a hole plug from another angle in accordance with Example 3.
Figure 17:
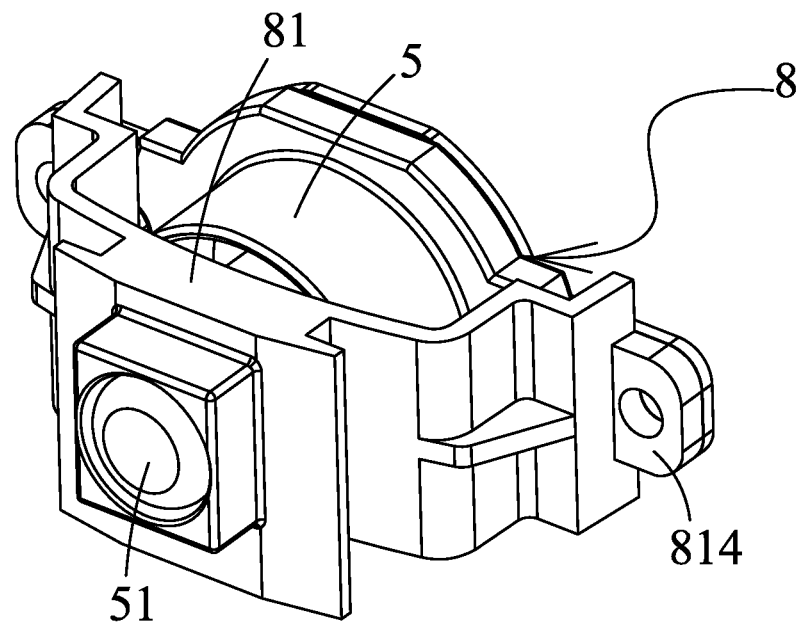
FIG. 17 is a stereogram of a mounting structure for a reset protector from one angle in accordance with Example 4.
Figure 18:
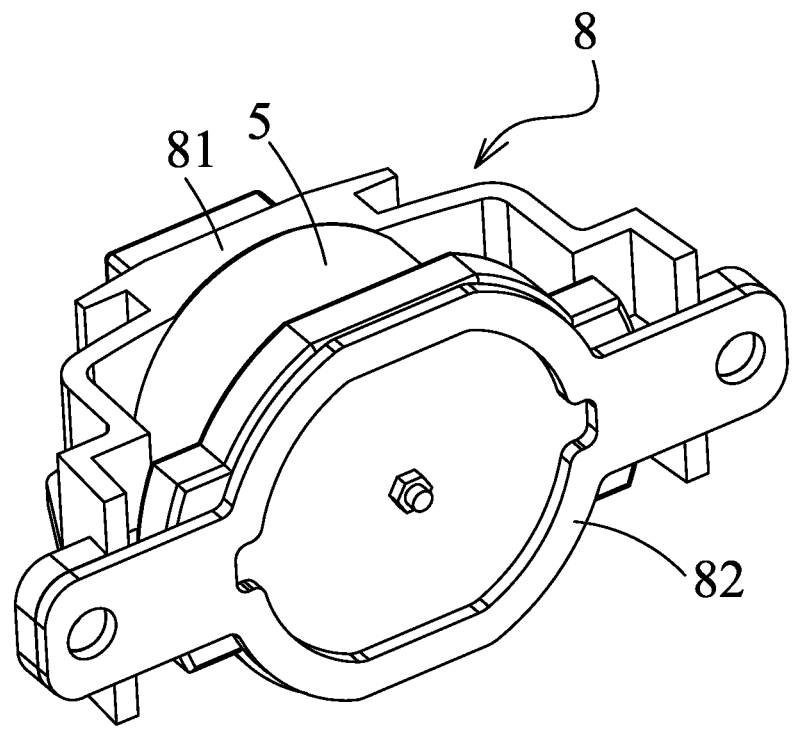
FIG. 18 is a stereogram of a mounting structure for a reset protector from another angle in accordance with Example 4.
Figure 19:
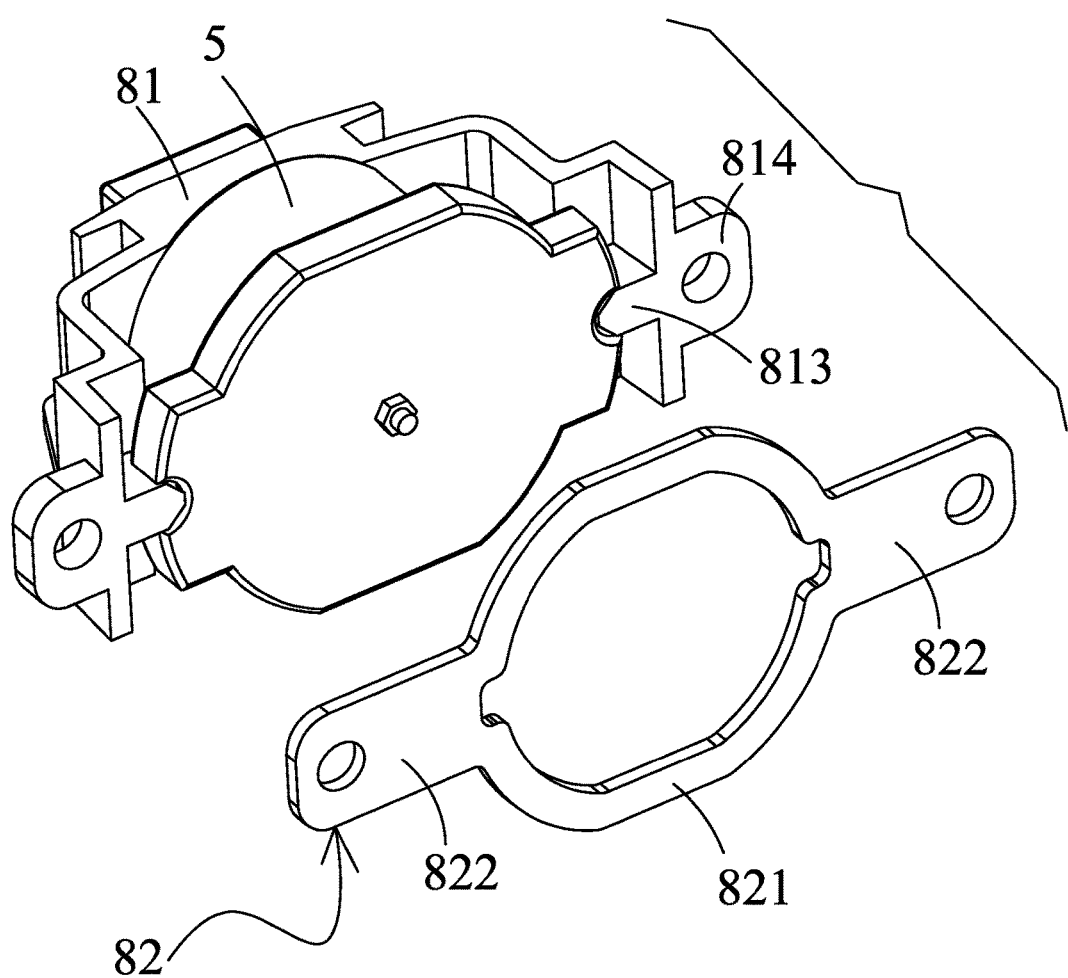
FIG. 19 is an exploded view of a mounting structure for a reset protector in accordance with Example 4.
Figure 20:
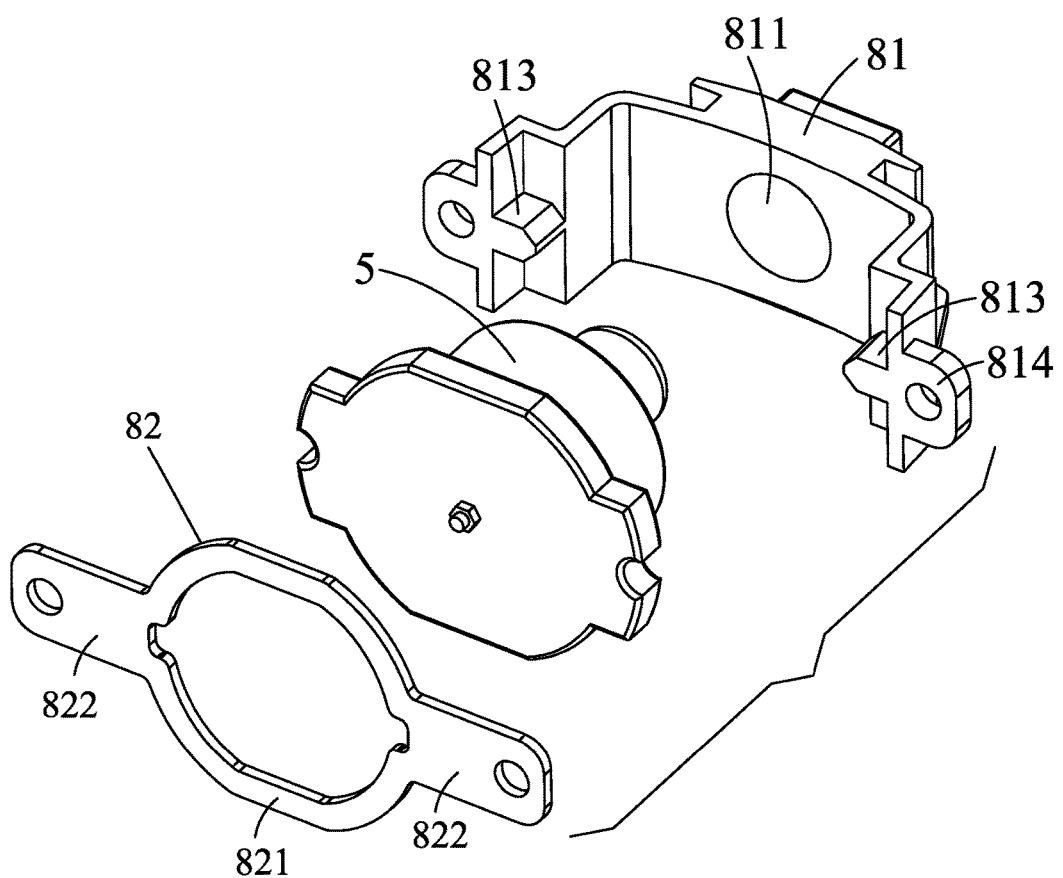
FIG. 20 is another exploded view of a mounting structure for a reset protector in accordance with Example 4.
Figure 21:
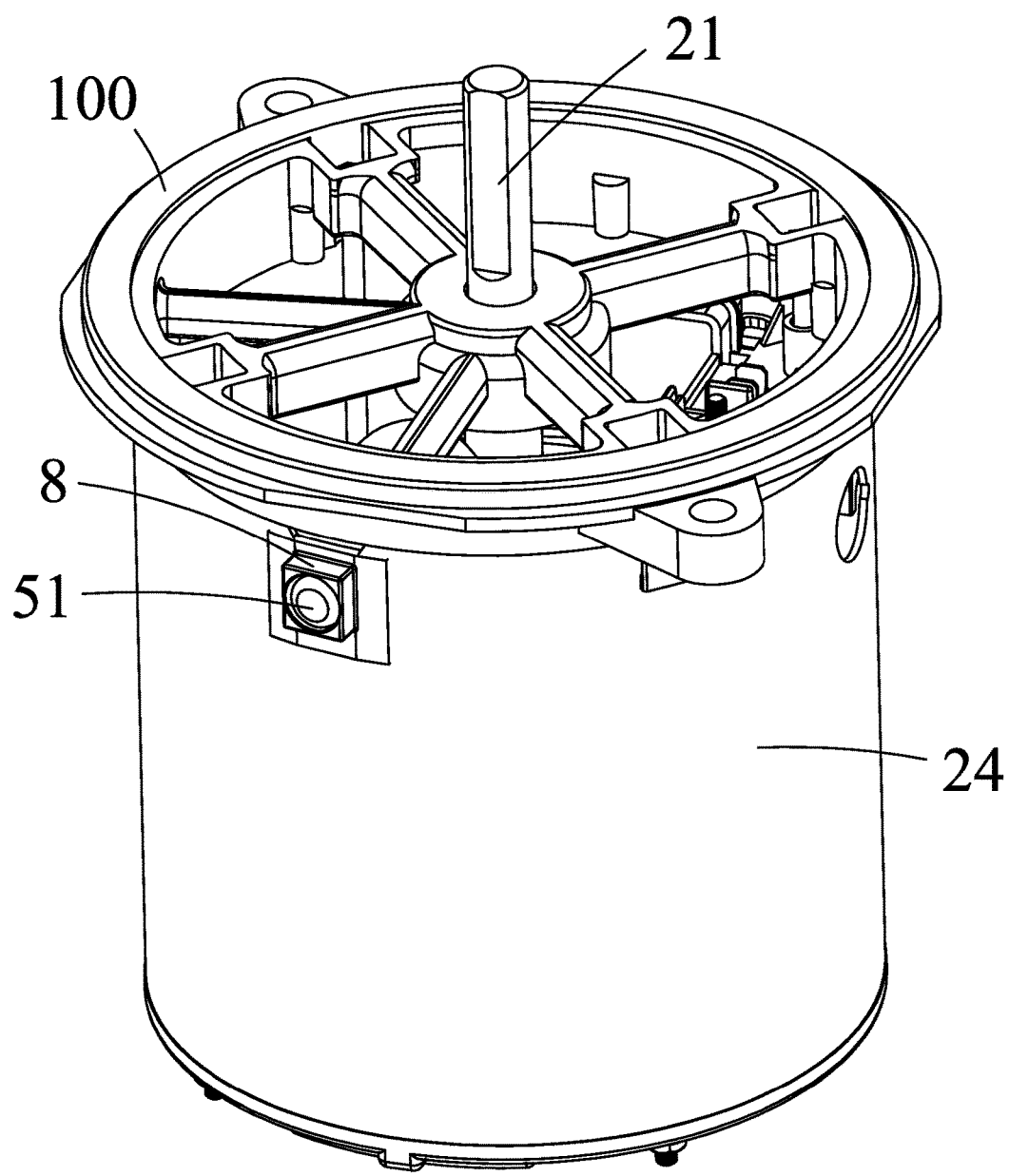
FIG. 21 is a stereogram of a mounting structure for a reset protector installed on a motor in accordance with Example 4.
Figure 22:
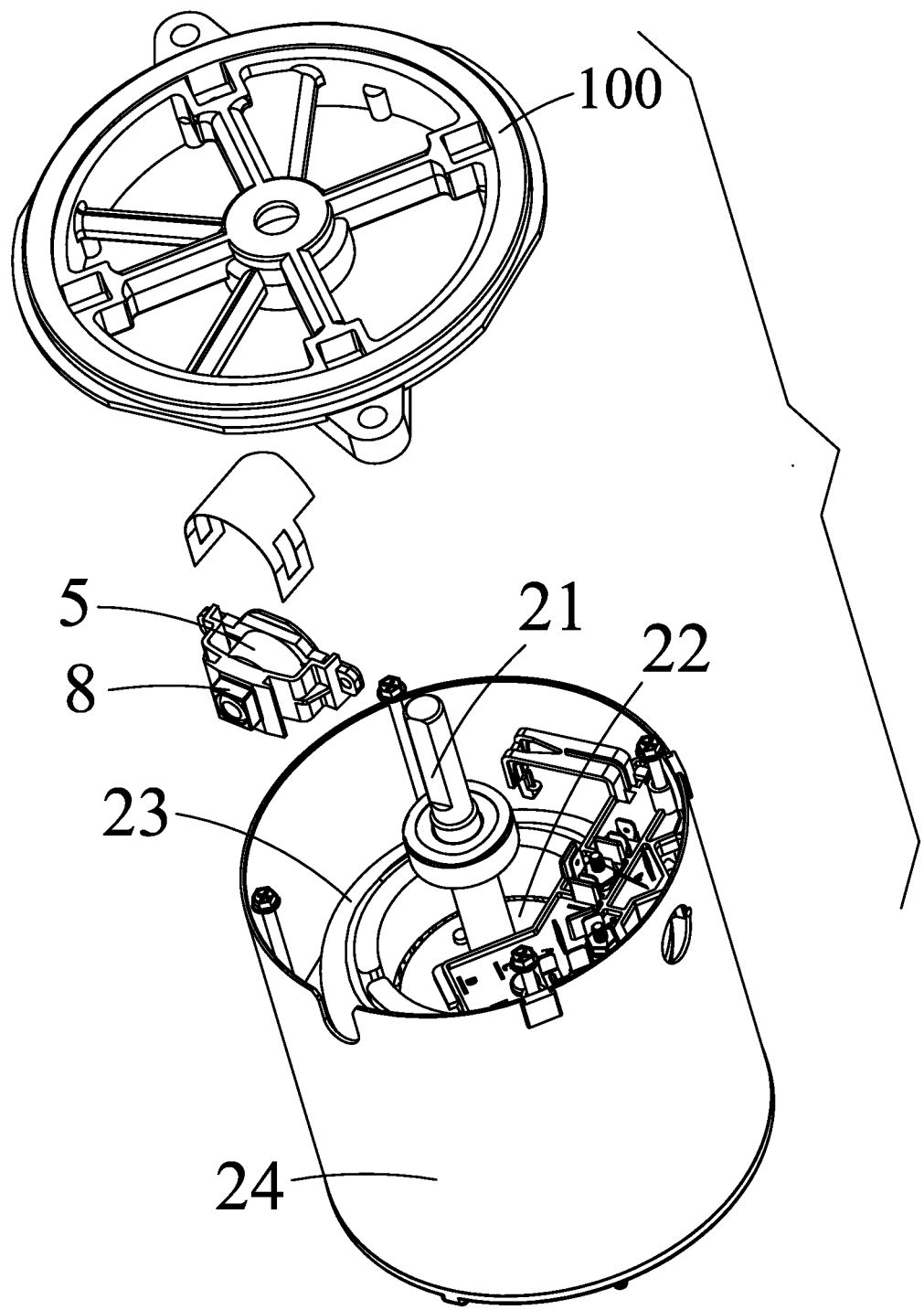
FIG. 22 is an exploded view of a mounting structure for a reset protector installed on a motor in accordance with Example 4.
Figure 23:
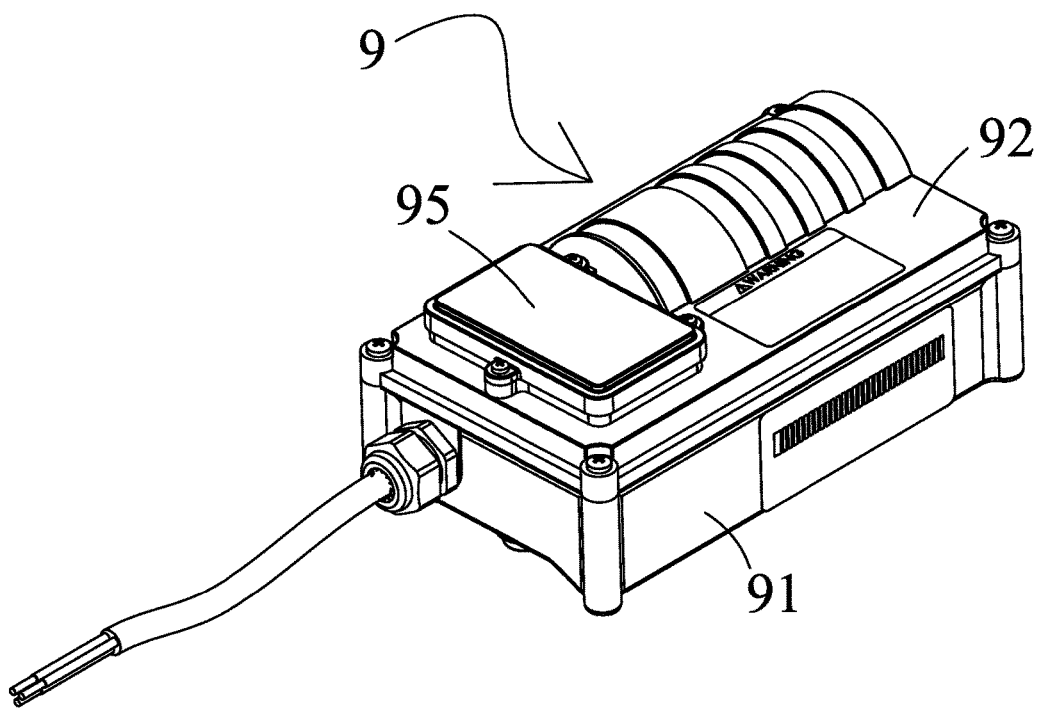
FIG. 23 is a stereogram of a capacitance assembly in accordance with Example 5.
Figure 24:
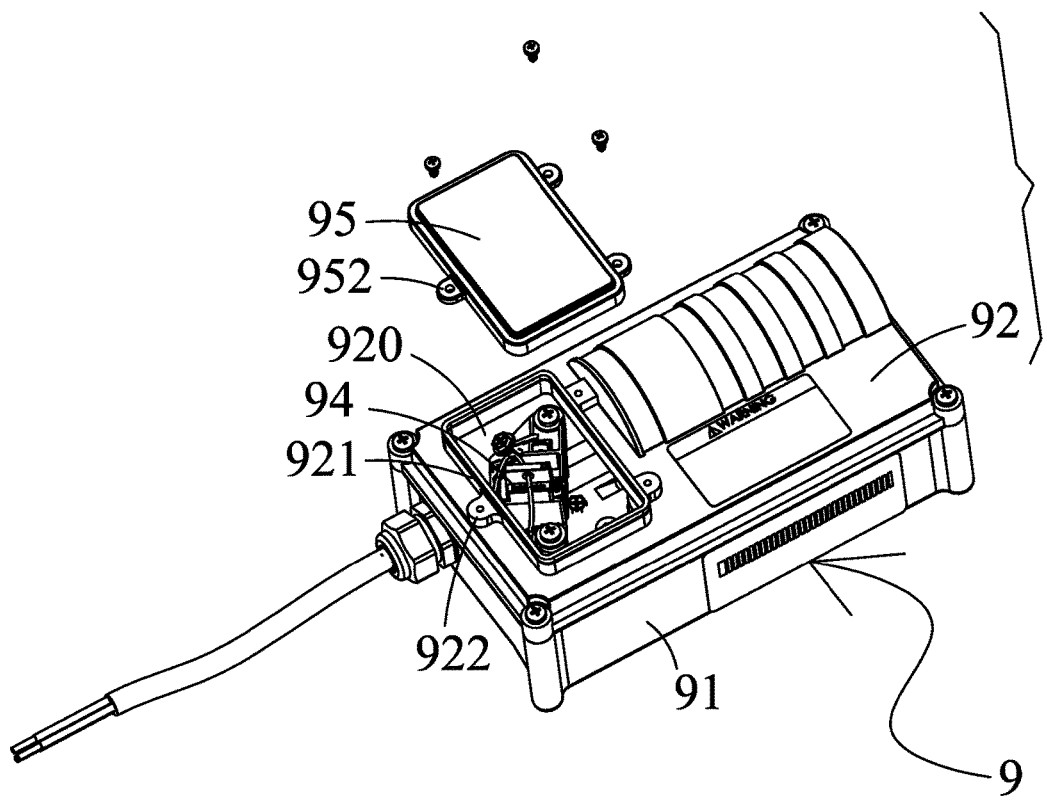
FIG. 24 is an exploded view of a capacitance assembly in accordance with Example 5.
Figure 25:
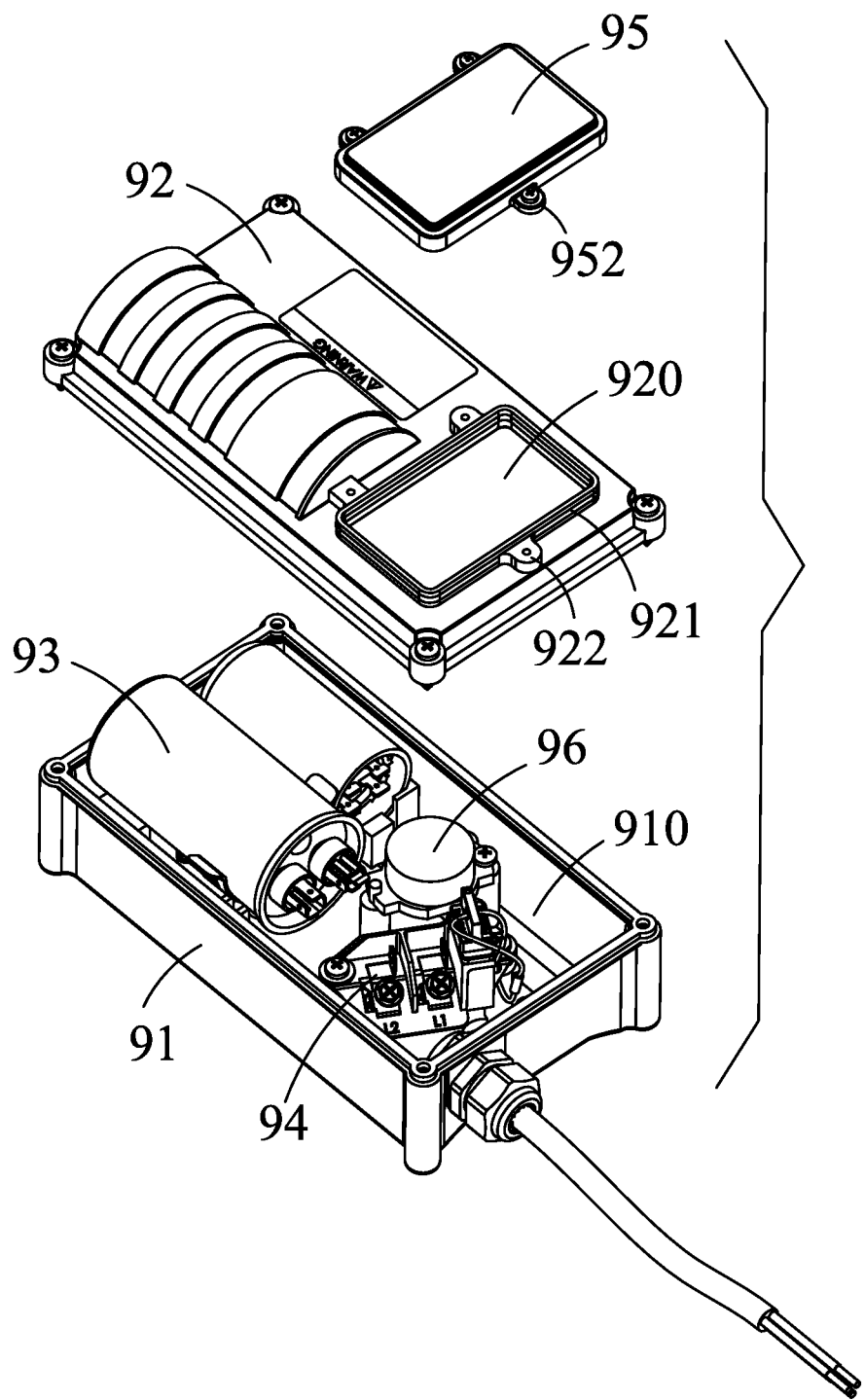
FIG. 25 is another exploded view of a capacitance assembly in accordance with Example 5.
Figure 26:
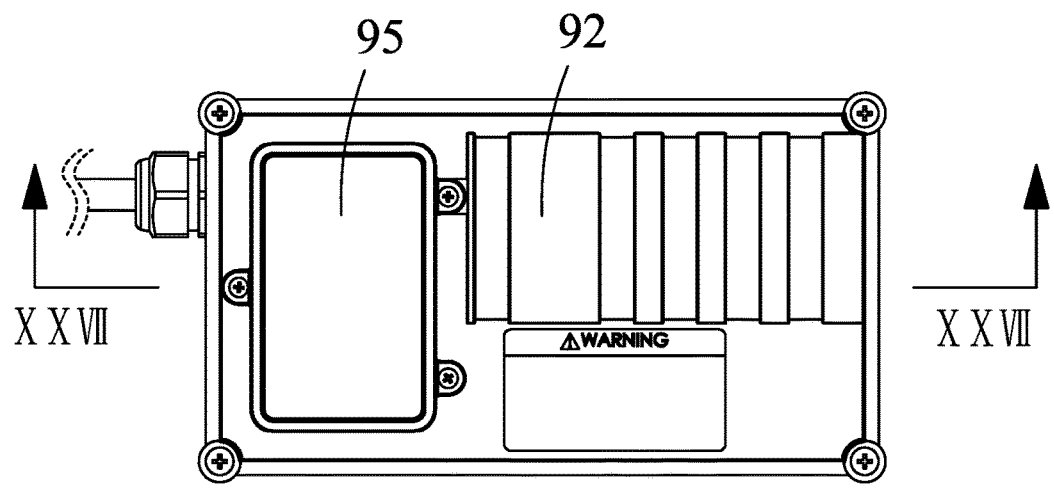
FIG. 26 is a top view of a capacitance assembly in accordance with Example 5.
Figure 27:
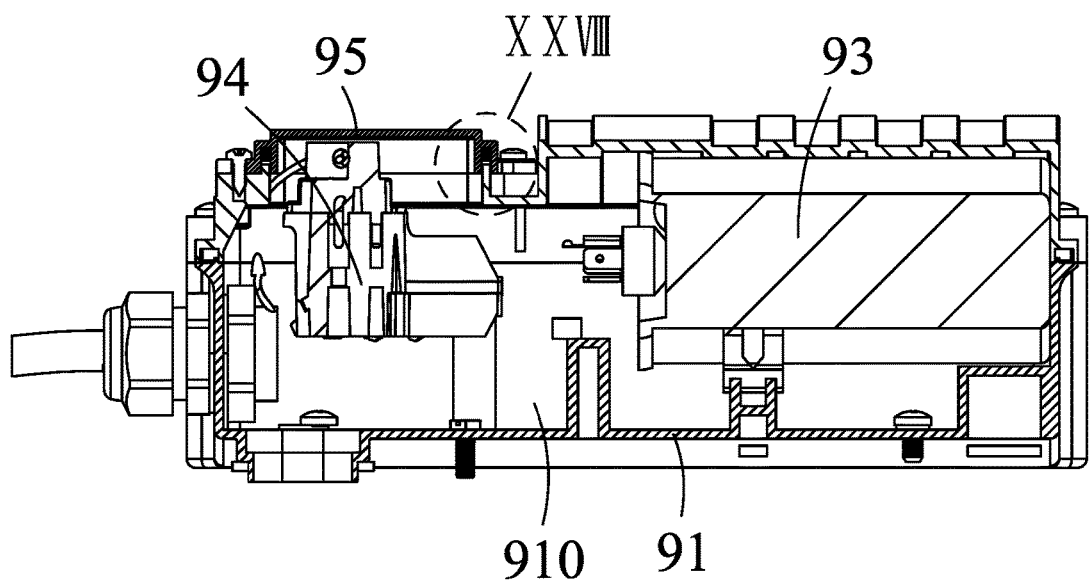
FIG. 27 is a cross sectional view taken from line A-A of FIG. 26.
Figure 28:
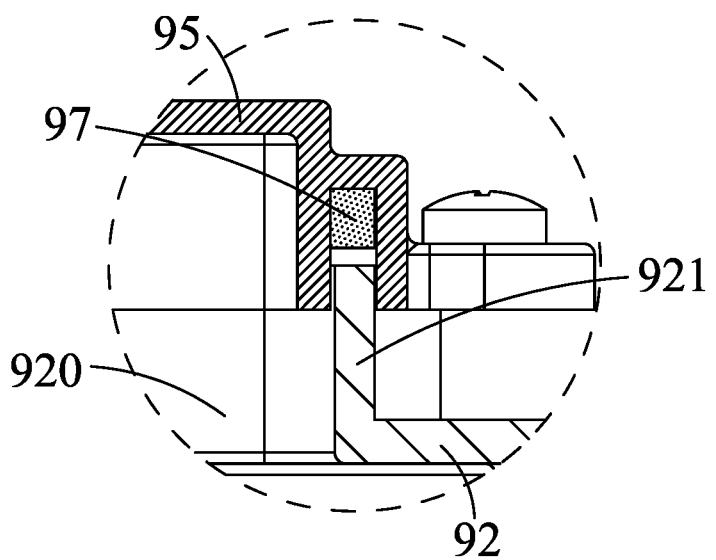
FIG. 28 is an enlarged view of part XXVIII FIG. 27.
Figure 29:
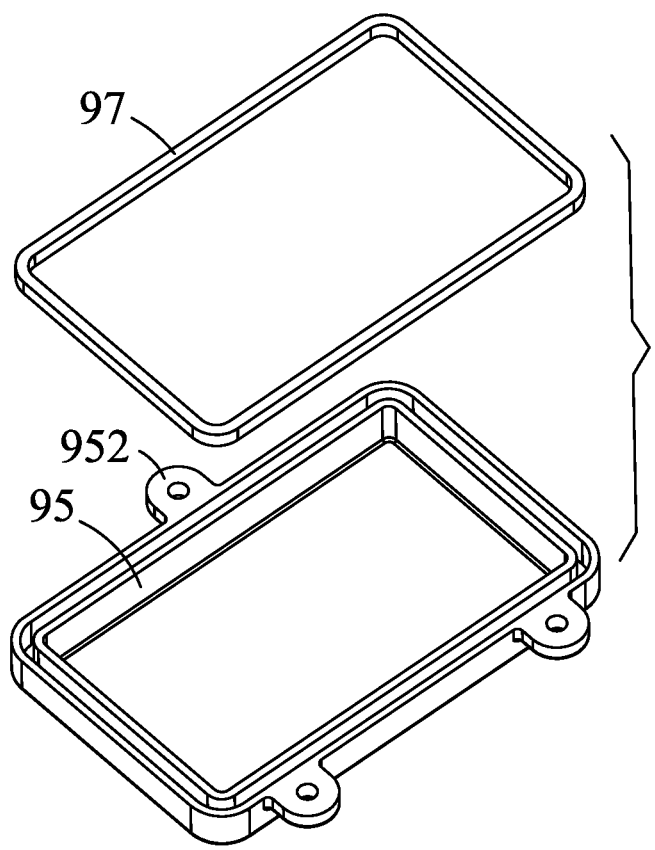
FIG. 29 is a structure diagram showing assemblage of a lid and a sealing ring in accordance with Example 5.
Figure 30:
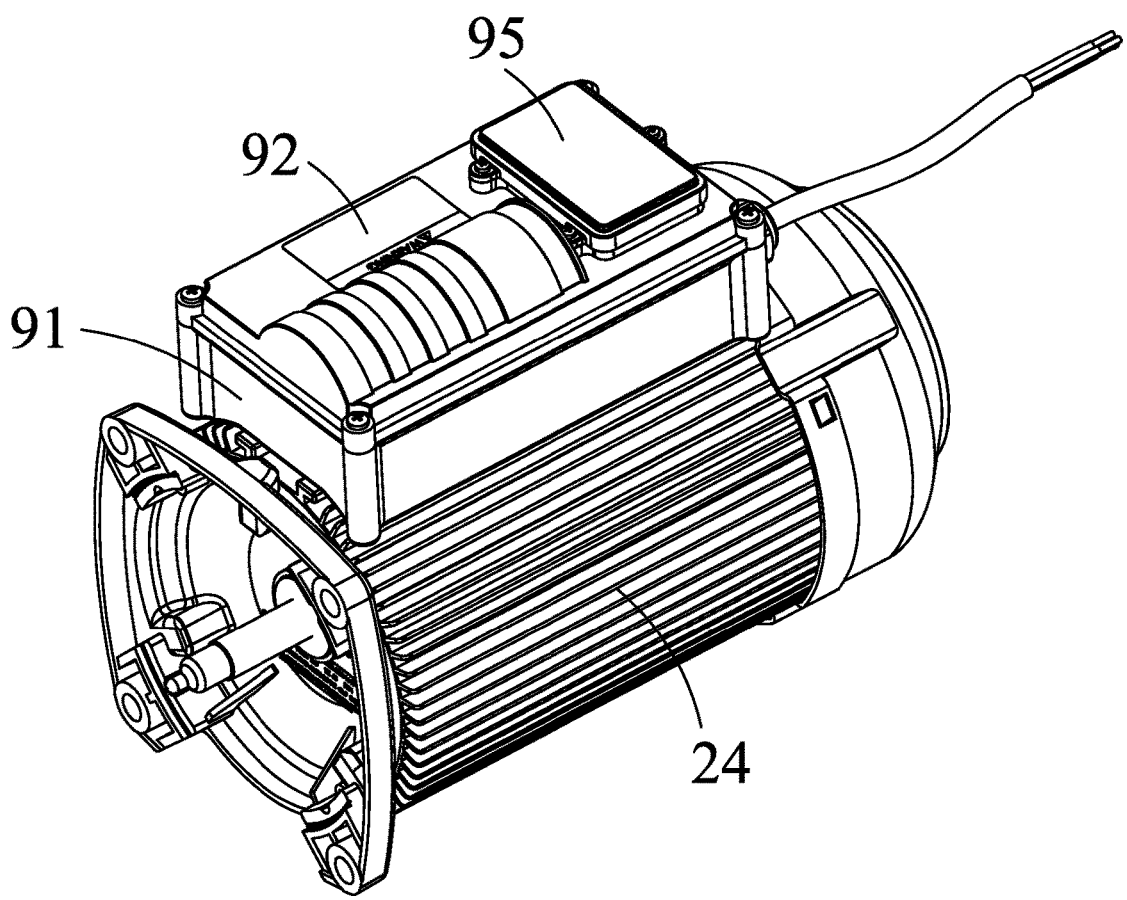
FIG. 30 is a stereogram of a capacitance assembly installed on a motor in accordance with Example 5.

As shown in FIGS. 6-8, a motor comprises a rotational shaft 21, a rotor 22, a stator 23, a housing 24, and end covers. The rotor 22 is mounted on the rotational shaft 21. The stator 23 is nested and mounted inside the housing 24. The rotor 22 is nested inside the stator 23. The end covers are respectively disposed on two ends of the housing 24, in which, the end cover disposed at a rear end of the housing 24 is the one as described in the above.

A screw 3 is mounted in the counterbore 15 for guiding a ground wire connected to the screw 3 out of a wire slot. A wiring board assembly 4 is installed on a bottom surface 10 of the cover body 1 at the opening 13, and a baffle plate 6 is installed on a top surface 20 of the cover body 1. Preferably, the wiring board assembly 4 is installed on the mounting bosses 17 of the bottom surface 10 of the cover body 1. A protector 5 is installed on the bottom surface 10 of the cover body 1, and a reset switch of the protector 5 is protruded from the circular hole 16. Preferably, the protector 5 is installed on the mounting bosses 17 of the bottom surface 10 of the cover body 1.

EXAMPLE 2

The example illustrates an improvement of the rotor of Example 1, as shown in FIGS. 9-12. The rotor 22 is a cast-aluminum rotor and comprises: a rotor core 221, end rings 222, and a conductive strip 223. A shaft hole 220 is disposed in a middle of the rotor core. The end rings are mounted on end parts of the rotor core 221. The conductive strip 223 passes through the rotor core 221 and is electrically connected to the end rings 222 on the end parts of the rotor cores 221. An annular groove is disposed on an end face of a first end ring 222; and a balance weight 225 is mounted inside the annular groove. The annular groove of the first end ring 222 has a U-shaped cross section; and a plurality of fan blades 226 is disposed on an end face of a second end ring 222. Balance columns 227 are disposed on the end face of the second end ring 222 between every two adjacent fan blades 226.

EXAMPLE 3

This example is an improvement of the rotor of Example 1. As shown in FIGS. 13-16, a hole plug 7 is mounted on the wire slots. The port lug 7 comprises: an inner baffle 71, an outer baffle 72, and a plurality of plug bodies 73 disposed at intervals between the inner baffle 71 and the outer baffle 72. Cavities are formed between every two adjacent plug bodies 73. An outer wall of the inner baffle 71 is attached to an inner wall of the edge of the cover body 1, an inner wall of the outer baffle 72 is attached to an outer wall of the edge of the cover body 1. Each of the plug bodies 73 is embedded in corresponding wire slot 4. Tops of the inner baffle 71, the outer baffle 72, and the plug bodies are arranged in a same plane. Heights and widths of the inner baffle 71 and the outer baffle 72 are larger than heights and widths of the plug bodies to form first necks between the inner baffle 71 and the outer baffle 72 at two sides and bottom parts of each of the plug bodies 73. The cover body 1 is embedded in the first necks.

EXAMPLE 4

The protector 5 in Example 1 is disposed on the bottom surface 10 of the cover body 1. As an improvement, a mounting structure 8 for a reset protector is disposed on the housing 24. The mounting structure 8 comprises: a fixing clamp 81 and a buckle clamp 82. A mounting trough is disposed on a middle of the fixing clamp 81, and a first through hole 811 is also disposed on the fixing clamp 81. The first through hole 811 communicates with the mounting trough. The reset protector 5 is installed in the mounting trough, and a button 51 of the reset protector is protruded from the first through hole 811. The buckle clamp 82 is installed on the fixing clamp 81 for fixing the reset protector 5 inside the mounting trough.

Second necks are disposed on an outer wall of the fixing clamp 81 at two sides of the first through hole 811. Second recesses are disposed on two side walls of the reset protector 5; second bosses 813 are disposed on an inner wall of the mounting trough; and the second bosses 813 are embedded in the second recesses. The buckle clamp 82 comprises: an annular press plate 821 disposed in a middle of the buckle clamp 82 and mounting earrings 822 disposed at two sides of the annular press plate 821. Mounting feet 814 are disposed at two side walls of the fixing clamp 81. The annular press plate 821 presses on a bottom of the reset protector 5. The mounting earrings 822 and the mounting feet 814 are installed together via screws or rivets.

A second end cover 100 is installed on a front end of the housing 24. The rotational shaft 21 is supported by a bearing of the second end cover 100. The reset protector 5 is disposed on a side wall of the housing 24, and a button 51 of the reset protector 5 faces towards an external of the housing. A positioning groove is disposed on the front end part of the housing 24. The fixing clamp 81 is embedded in the positioning groove. The front end cover 100 is installed on the front end of the housing and enables the fixing clamp 81 to press the positioning groove, and necks are disposed on an outer side wall to lock the fixing clamp on the housing 24 in the vicinity of the positioning groove.

EXAMPLE 5

As shown in FIGS. 23-30, a capacitance assembly 9 is optionally installed on an outer side of the housing 24. The capacitance assembly 9 comprises: a casing 91, a cover 92, and a capacitance 93. A cavity 910 is disposed in a middle of the casing 91. The capacitance is installed in the cavity 910. The cover 92 is disposed on a top of the casing 91 and covers an opening at a top of the cavity 910. A voltage converting switch 94 is installed in the cavity 910. A second through hole 920 is disposed on the cover 92 above the voltage converting switch 94. A lid 95 is installed on a top of the cover 92 for covering the second through hole 92. A temperature controller 96 is installed in the cavity 910. An annular convex part 921 is convex from the top of the cover 92 at an inner wall of the second through hole 920. An annular groove is disposed at an edge of a bottom part of the lid 95. The annular convex part 921 is embedded in the annular groove. A plurality of first mounting earrings 922 is extended out of the annular convex part 921. A plurality of second mounting earrings 952 is extended out of the lid 95. Each of the first mounting earrings 922 and corresponding second mounting earrings 952 are locked together via screws. A sealing ring 97 is embedded in the annular groove.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor, comprising:
   a) a rotational shaft;
   b) a rotor;
   c) a stator;
   d) a housing;
   e) a first end cover, the first end cover comprising: a cover body comprising a bottom surface and a top surface, a bearing cavity, and a plurality of first bosses; and
   f) a second end cover;
   wherein:
   the rotor is mounted on the rotational shaft; the stator is nested and installed inside the housing; the rotor is nested inside the stator;
   the first end cover and the second end cover are disposed on a rear end and a front end of the housing, respectively;
   the bearing cavity is disposed in a middle of the bottom surface of the cover body;
   the first bosses are circumferentially disposed at intervals on the top surface of the cover body;
   outer side surfaces of the first bosses are located on a cylindrical surface having a central axis coincident with a central axis of the cover body; and
   the outer side surfaces of the first bosses are adapted to be clamped for the purpose of positioning and fixing the first end cover.

2. The motor of claim 1, wherein first recesses are disposed on the top surface of the cover body between the outer side surfaces of the first bosses and an outer edge of the cover body; and an opening is disposed on the top surface of the cover body.

3. The motor of claim 2, wherein at least one wire slot is disposed on the outer edge of the cover body outside the opening; and the at least one wire slot is connected to the opening.

4. The motor of claim 3, wherein counterbores are disposed on the top surface of the cover body at an inner wall of the opening; and a circular hole is disposed at the top surface of the cover body.

5. The motor of claim 1, wherein a plurality of mounting bosses is disposed on the bottom surface of the cover body; a mounting seat is disposed in a middle of the top surface of the cover body; and a plurality of convex parts is extended in an axial direction and circumferentially distributed at intervals on an outer wall of the mounting seat.

6. The motor of claim 2, wherein a plurality of mounting bosses is disposed on the bottom surface of the cover body; a mounting seat is disposed in a middle of the top surface of the cover body; and a plurality of convex parts is extended in an axial direction and circumferentially distributed at intervals on an outer wall of the mounting seat.

7. A motor, comprising:
   a) a rotational shaft;
   b) a rotor;
   c) a stator;
   d) a housing;
   e) a first end cover, the first end cover comprising: a cover body comprising a bottom surface and a top surface, a bearing cavity, and a plurality of first bosses; and f) a second end cover;
wherein:
the rotor is mounted on the rotational shaft the stator is nested and installed inside the housing; the rotor is nested inside the stator;
the first end cover and the second end cover are disposed on a rear end and a front end of the housing, respectively;
a diameter of a circumferential edge of the cover body is substantially equal to a diameter of a circumferential edge of the housing;
the bearing cavity is disposed in a middle of the bottom surface of the cover body; the first bosses are circumferentially disposed at intervals on the top surface of the cover body;
outer side surfaces of the first bosses are located on a cylindrical surface having a central axis coincident with a central axis of the cover body;
the rotor is a cast-aluminum rotor and comprises: a rotor core, end rings, and a conductive strip;
a shaft hole is disposed in a middle of the rotor core; the end rings are mounted on end parts of the rotor core;
the conductive strip passes through the rotor core and is electrically connected to the end rings on the end parts of the rotor cores;
an annular groove is disposed on an end face of a first end ring; and
a balance weight is mounted inside the annular groove.

8. The motor of claim 2, wherein the rotor is a cast-aluminum rotor and comprises: a rotor core, end rings, and a conductive strip; a shaft hole is disposed in a middle of the rotor core; the end rings are mounted on end parts of the rotor core; the conductive strip passes through the rotor core and is electrically connected to the end rings on the end parts of the rotor cores; an annular groove is disposed on an end face of a first end ring; and a balance weight is mounted inside the annular groove.

9. The motor of claim 7, wherein the annular groove of the first end ring has a U-shaped cross section; and a plurality of fan blades is disposed on an end face of a second end ring; and balance columns are disposed on the end face of the second end ring between every two adjacent fan blades.

10. The motor of claim 8, wherein the annular groove of the first end ring has a U-shaped cross section; and a plurality of fan blades is disposed on an end face of a second end ring; and balance columns are disposed on the end face of the second end ring between every two adjacent fan blades.

11. The motor of claim 3, wherein a hole plug is mounted on the wire slots; the port lug comprises: an inner baffle, an outer baffle, and a plurality of plug bodies disposed at intervals between the inner baffle and the outer baffle; cavities are formed between every two adjacent plug bodies; an outer wall of the inner baffle is attached to an inner wall of the edge of the cover body, an inner wall of the outer baffle is attached to an outer wall of the edge of the cover body; and each of the plug bodies is embedded in corresponding wire slot.

12. The motor of claim 11, wherein tops of the inner baffle, the outer baffle, and the plug bodies are arranged in a same plane; heights and widths of the inner baffle and the outer baffle are larger than heights and widths of the plug bodies to form first necks between the inner baffle and the outer baffle at two sides and bottom parts of each of the plug bodies; and the cover body is embedded in the first necks.

13. A motor, comprising:
a) a rotational shaft;
b) a rotor;
c) a stator;
d) a housing;
e) a first end cover, the first end cover comprising: a cover body comprising a bottom surface and a top surface, a bearing cavity, and a plurality of first bosses; and
f) a second end cover;
wherein:
the rotor is mounted on the rotational shaft the stator is nested and installed inside the housing; the rotor is nested inside the stator;
the first end cover and the second end cover are disposed on a rear end and a front end of the housing, respectively;
a diameter of a circumferential edge of the cover body is substantially equal to a diameter of a circumferential edge of the housing;
the bearing cavity is disposed in a middle of the bottom surface of the cover body; the first bosses are circumferentially disposed at intervals on the top surface of the cover body;
outer side surfaces of the first bosses are located on a cylindrical surface having a central axis coincident with a central axis of the cover body;
a mounting structure for a reset protector is disposed on the housing;
the mounting structure comprises: a fixing clamp and a buckle clamp;
a mounting trough is disposed on a middle of the fixing clamp, and a first through hole is also disposed on the fixing clamp;
the first through hole is connected to the mounting trough;
the reset protector is installed in the mounting trough, and a button of the reset protector is protruded from the first through hole; and
the buckle clamp is installed on the fixing clamp for fixing the reset protector inside the mounting trough.

14. The motor of claim 2, wherein a mounting structure for a reset protector is disposed on the housing; the mounting structure comprises: a fixing clamp and a buckle clamp; a mounting trough is disposed on a middle of the fixing clamp, and a first through hole is also disposed on the fixing clamp; the first through hole is connected to the mounting trough; the reset protector is installed in the mounting trough, and a button of the reset protector is protruded from the first through hole; and the buckle clamp is installed on the fixing clamp for fixing the reset protector inside the mounting trough.

15. The motor of claim 13, wherein second necks are disposed on an outer wall of the fixing clamp at two sides of the first through hole; second recesses are disposed on two side walls of the reset protector; second bosses are disposed on an inner wall of the mounting trough; the second bosses are embedded in the second recesses; the buckle clamp comprises: an annular press plate disposed in a middle of the buckle clamp and mounting earrings disposed at two sides of the annular press plate; mounting feet are disposed at two side walls of the fixing clamp; the annular press plate presses on a bottom of the reset protector; and the mounting earrings and the mounting feet are installed together via screws or rivets.

16. The motor of claim 14, wherein second necks are disposed on an outer wall of the fixing clamp at two sides of the first through hole; second recesses are disposed on two side walls of the reset protector; second bosses are disposed on an inner wall of the mounting trough; the second bosses are embedded in the second recesses; the buckle clamp comprises: an annular press plate disposed in a middle of the buckle clamp and mounting earrings disposed at two sides of the annular press plate; mounting feet are disposed at two side walls of the fixing clamp; the annular press plate presses on a bottom of the reset protector; and the mounting earrings and the mounting feet are installed together via screws or rivets.

17. The motor of claim 1, wherein a capacitance assembly is installed on an outer side of the housing; the capacitance assembly comprises: a casing, a cover, and a capacitance; a cavity is disposed in a middle of the casing; the capacitance is installed in the cavity; the cover is disposed on a top of the casing and covers an opening at a top of the cavity; a voltage converting switch is installed in the cavity; a second through hole is disposed on the cover above the voltage converting switch; and a lid is installed on a top of the cover for covering the second through hole.

18. The motor of claim 2, wherein a capacitance assembly is installed on an outer side of the housing; the capacitance assembly comprises: a casing, a cover, and a capacitance; a cavity is disposed in a middle of the casing; the capacitance is installed in the cavity; the cover is disposed on a top of the casing and covers an opening at a top of the cavity; a voltage converting switch is installed in the cavity; a second through hole is disposed on the cover above the voltage converting switch; and a lid is installed on a top of the cover for covering the second through hole.

19. The motor of claim 17, wherein a temperature controller is installed in the cavity; an annular convex part is convex from the top of the cover at an inner wall of the second through hole; an annular groove is disposed at an edge of a bottom part of the lid; the annular convex part is embedded in the annular groove; a plurality of first mounting earrings is extended out of the annular convex part; a plurality of second mounting earrings is extended out of the lid; each of the first mounting earrings and corresponding second mounting earrings are locked together via screws; and a sealing ring is embedded in the annular groove.

20. The motor of claim 18, wherein a temperature controller is installed in the cavity; an annular convex part is convex from the top of the cover at an inner wall of the second through hole; an annular groove is disposed at an edge of a bottom part of the lid; the annular convex part is embedded in the annular groove; a plurality of first mounting earrings is extended out of the annular convex part; a plurality of second mounting earrings is extended out of the lid; each of the first mounting earrings and corresponding second mounting earrings are locked together via screws; and a sealing ring is embedded in the annular groove.

* * * * *